United States Patent [19]

Ise

[11] Patent Number: 5,536,105
[45] Date of Patent: Jul. 16, 1996

[54] DEVICE FOR FIXING ROTARY BODY

[75] Inventor: Yoji Ise, Tokyo, Japan

[73] Assignee: Myotoku, Ltd., Tokyo, Japan

[21] Appl. No.: 232,140

[22] PCT Filed: Sep. 1, 1993

[86] PCT No.: PCT/JP93/01234

§ 371 Date: Aug. 12, 1994

§ 102(e) Date: Aug. 12, 1994

[87] PCT Pub. No.: WO94/05922

PCT Pub. Date: Mar. 17, 1994

[30] Foreign Application Priority Data

Sep. 4, 1992 [JP] Japan .................................. 4-072050

[51] Int. Cl.$^6$ ..................................................... F16D 1/06
[52] U.S. Cl. ........................... 403/371; 403/367; 403/370
[58] Field of Search ..................................... 403/367, 368, 403/370, 371

[56] References Cited

U.S. PATENT DOCUMENTS

| | | | |
|---|---|---|---|
| 1,138,368 | 5/1915 | Feeley | 403/367 |
| 1,612,769 | 12/1926 | O'Connell | 403/370 X |
| 2,043,272 | 6/1936 | Wallgren | 403/370 X |
| 2,691,541 | 10/1954 | Benedek | 403/370 |
| 3,656,785 | 4/1972 | Lothar | 403/370 |
| 3,664,167 | 5/1972 | Sack | 72/251 |

FOREIGN PATENT DOCUMENTS

| | | | |
|---|---|---|---|
| 239551 | 9/1987 | European Pat. Off. | 403/370 |
| 2061143 | 9/1970 | France. | |
| 1947765 | 9/1969 | Germany. | |
| 1111086 | 7/1936 | Japan. | |
| 47-25671 | 11/1972 | Japan. | |
| 48-22578 | 7/1973 | Japan. | |
| 58-68508 | 4/1983 | Japan. | |
| 62-163314 | 10/1987 | Japan. | |

Primary Examiner—Blair Johnson
Assistant Examiner—Andrea Chop
Attorney, Agent, or Firm—Alfred W. Froebrich; Christopher R. Pastel; Thomas R. Morrison

[57] ABSTRACT

A device for tight fixing a rotary body such as a gear and a pulley, to a rotary shaft such as a motor shaft and a transmitting shaft, provides a slippage between the rotary body and the rotary shaft when an over-load occurs to the rotary body. A groove portion is formed either at the inner surface of a mounting hole in the center of the rotary body or at the outer surface of the rotary shaft, in which a pair of key members having a tapered contact surface are arranged in the longitudinal direction of the rotary shaft. A clamping bolt going through one of key members is screwed into the other key member, and pressed to both key members. Due to the pressure from the clamping bolt, each key member is displaced outward as guided by the tapered surface. One of key members makes a contact with the inner surface of the mounting hole or rotary body, and at the same time, the other begins to press the outer surface of the rotary shaft, respectively. Further force to the key members from the clamping bolt creates a tight fixing of the rotary body and the rotary shaft through the key members. The appropriate fixing force adjusted by the key members permits the slippage between the rotary body and the rotary shaft when the over-load is given unexpectedly.

7 Claims, 5 Drawing Sheets

DEVICE FOR FIXING ROTARY BODY

FIELD OF THE INVENTION

This invention relates to a device for fixing a rotary body such as a pulley to a rotary shaft such as a motor shaft, and more specifically, to the device for fixing a rotary body to a rotary shaft which permits a slippage between the rotary body and the rotary shaft when the rotary body receives unexpected over-load.

BACKGROUND OF THE INVENTION

Conventionally, a key is inserted into key grooves formed on both the rotary body and the rotary shaft when a rotary body such as a pulley and a gear is to be fixed to a rotary shaft. This provides a direct power transmission between the rotary shaft and the rotary body even when an over-load force and an impact force occur at the rotary shaft, and has often produced troubles even with other elements.

On the contrary, the rotary body and the rotary shaft can be fixed by screws inserted in a traversal direction of the rotary shaft. However, this method makes less fixing strength, and occasionally more troublesome in the process of attaching screws, especially at the narrow area, because the screws have to be inserted in the traversal direction of the shaft.

Accordingly, it is an object of the invention to provide a device for fixing a rotary body to a rotary shaft which solves the above problems. The invention permits a slippage between the rotary body and the rotary shaft when an unexpected force such as an over-load force and an impact force occurs, but normally provides an appropriate fixing strength therebetween when both rotary body and shaft rotate together.

DISCLOSURE OF THE INVENTION

In the invention, a groove is formed at the outer surface of a rotary shaft or at the inner surface of a mounting hole of a rotary body. A pair of key members having a tapered contact surface are inserted into the groove in such a manner that both key members are arranged adjacently in the longitudinal direction of the rotary shaft as facing each tapered contact surface. The key numbers pushed in the longitudinal direction are displaced outward as guided by the tapered surface. The displaced key members make a contact with the inner surface of the mounting hole and the outer surface of the rotary shaft. Further pressure to key members allows one of key members to be pressed to the inner surface of the mounting hole and the other to be pressed to the outer surface of the rotary shaft. Thereby the rotary shaft and the rotary body are firmly fixed through the key members as by a wedge. Since the groove is only formed either at the rotary body or at the rotary shaft, when an impact force occurs to the rotary body, a slippage can be created between the rotary body and the rotary shaft, which prevents the breakage of other elements.

DETAILED DESCRIPTION OF THE PREFERRED EMBODIMENTS

The invention is described below with accompanying drawings.

Figure 1:
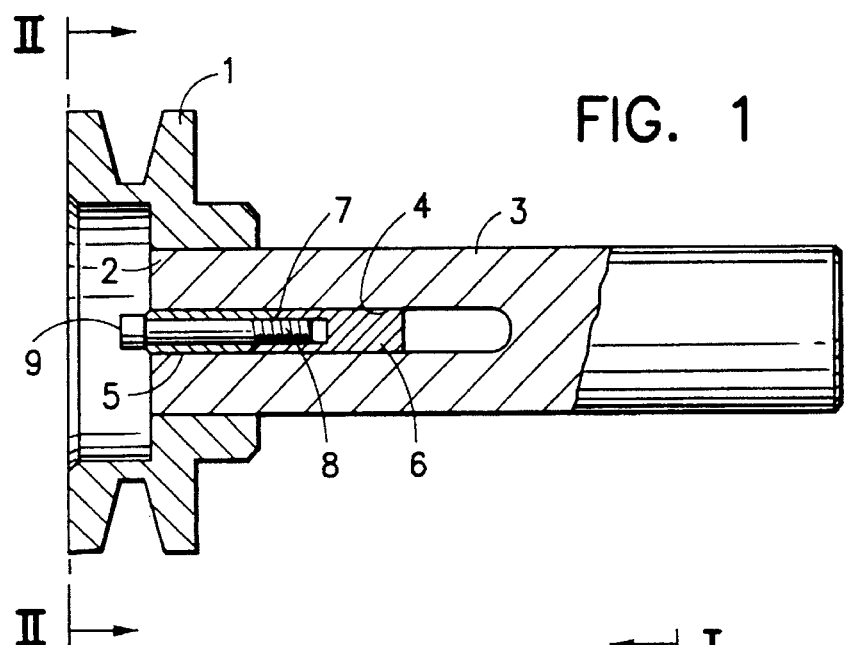
FIG. 1 is a cross section view of a device for fixing a rotary body along the line I—I of FIG. 2.
Figure 2:
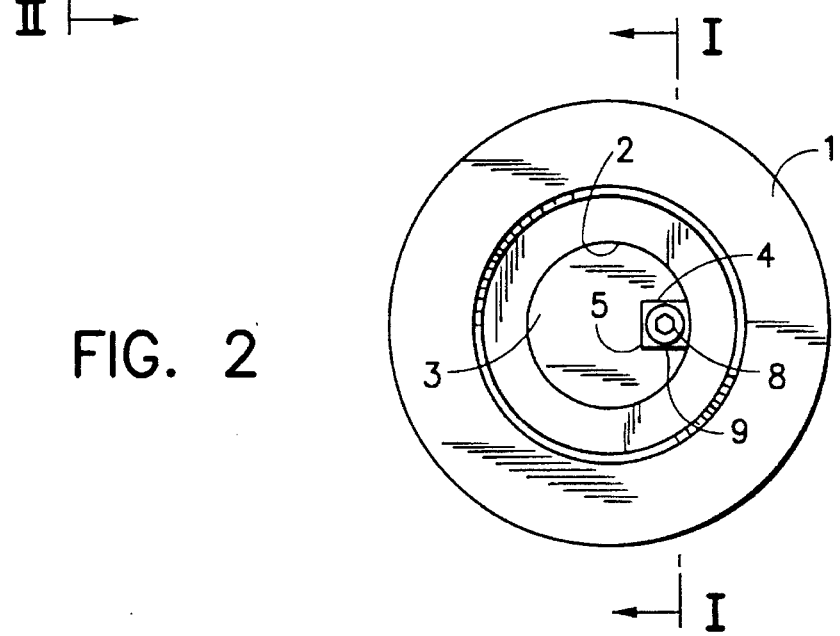
FIG. 2 is a plan view of the device of FIG. 1 along the line II—II.

Referring to FIGS. 1 and 2, a rotary body 1 such as a pulley and a gear contains a mounting hole 2 in the center, and a rotary shaft 3 such as a motor shaft and a power transmission shaft is inserted into mounting hole 2.

At least one groove portion 4 is formed at the outer surface of rotary shaft 3. As described below, groove portion 4 can be :formed in rotary body 1.

A pair of key members 5 and 6 are inserted in groove portion 4 as arranged adjacently in the longitudinal direction of rotary shaft 3. Key members 5 and 6 have a shape corresponding to groove portion 4. For example, in the embodiment, since groove portion 4 has a square-like shape in the cross-section, then key members 5 and 6 have the square-like shape, whose one side facing the inner surface of rotary body has a partially spherical shape corresponding to the inner surface. It is acceptable to utilize other shapes such as triangle, pentagon and hexagon in the cross-section for key members 5 and 6 according to groove portion 4.

A contact surface between key members 5 and 6 is taperingly formed so that key members 5 and 6 are displaced outward as guided by the tapered surface when pressed in the longitudinal direction.

Figure 3:
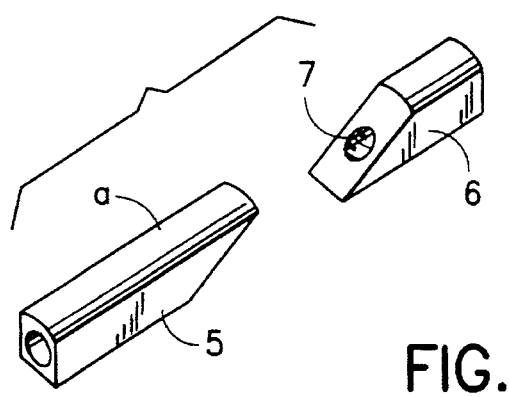
FIG. 3 is a perspective view of a pair of key members.
Figure 4:
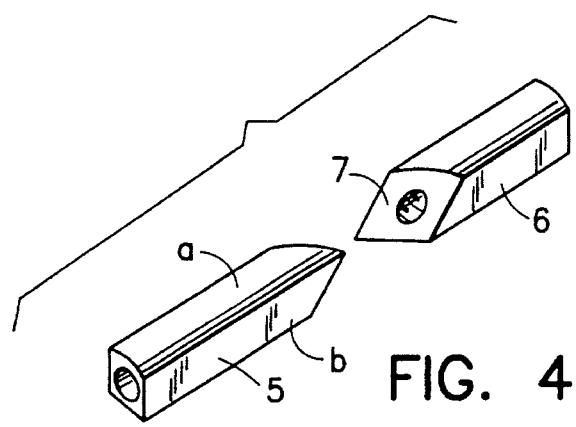
FIG. 4 is a perspective view of an alternative embodiment of a pair of key members.

Referring to FIGS. 3 and 4, the tapered surface is formed such that spherical surface of key member 5 is pressed to the inner surface of mounting hole 2. It is acceptable to form the tapered surface so that the two surfaces (a) and (b) of key members can be pressed to both groove portion 4 and the inner surface of mounting hole 2.

To fix key members 5 and 6 pressingly, there are many ways. In FIG. 1 and 2, a clamping bolt 8 is screwed to a thread of key member 6 through key member 5. Key members 5 and 6 are fixed when a top 9 of clamping bolt 8 is pushed. Key members 5 and 6 are resiliently held together by an elastic member such as a plate-shaped spring, a spring washer, or a coil spring. The elastic member is arranged between top of clamping bolt 8 and key member 5 to absorb a shock.

When clamping bolt 8 is inserted, key members 5, 6 are displaced along with the tapered surface 7, so that key member 5 is pressed and fixed to the inner surface of mounting hole 2, and at the same time, key member 6 is pressed and fixed to the outer surface of rotary shaft 3. However, since key members 5 and 6 are not attached in rotary body 1, a slippage occurs between rotary body 1 and rotary shaft 3 by an impact force to rotary body 1. It is possible to adjust the slippage by clamping bolt 8.

Figure 5:
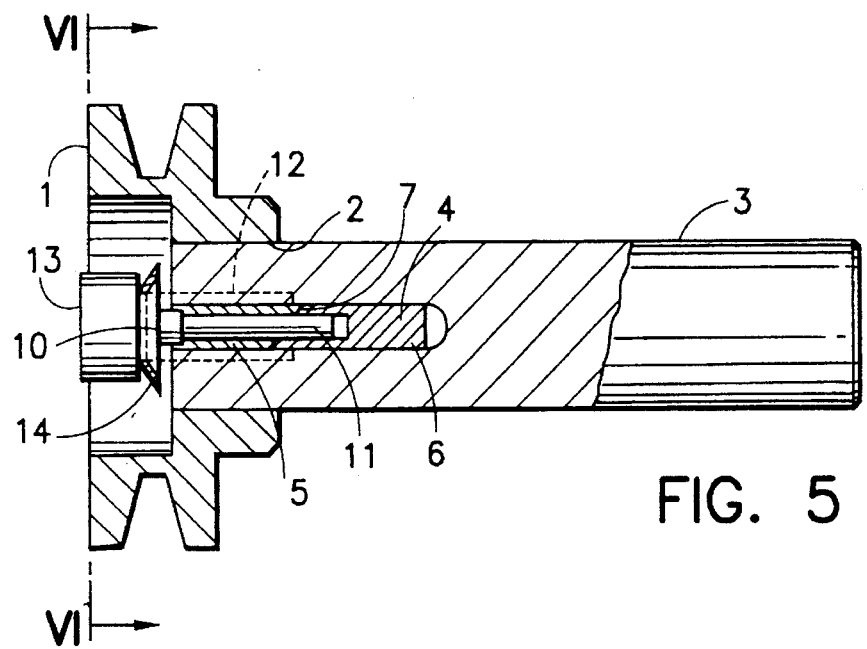
FIG. 5 is a cross section view of an alternative embodiment of a pressing bolt for fixing a rotary body along the line V—V of FIG. 6.
Figure 6:
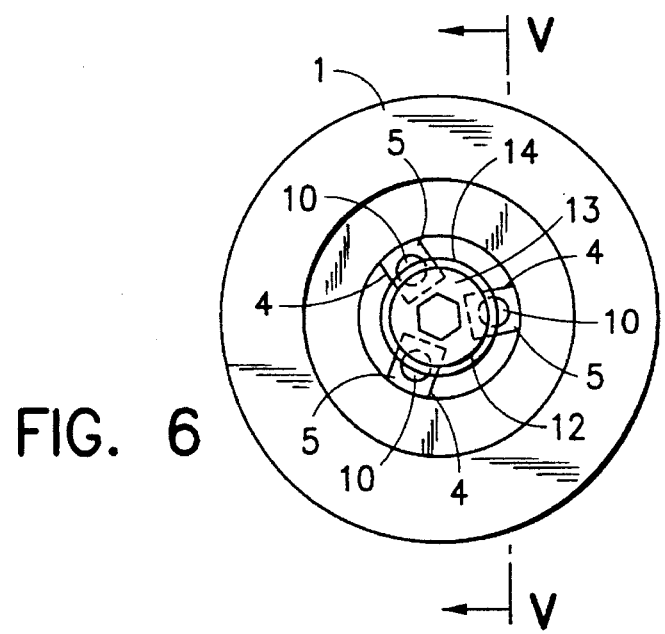
FIG. 6 is a plan view of the device of FIG. 5 along the line VI—VI.

Referring to FIGS. 5 and 6, in a further embodiment of the invention, three groove portions 4 are formed on the surface of rotary shaft 3. Key members 5 and 6 are placed at each groove portion. The number of groove portions can be altered. A pole member 11 with a top 10 are slidably inserted into key members 5 and 6, such that top 10 is against an outer end of key member 5. Top 10 has a substantially larger diameter than the rest of pole member 11.

A pressing bolt 12 is screwed at the center of rotary shaft 3. A plate-shaped spring 14 is formed below a top 13 of pressing bolt 12. Part of top 10 of pole member 11 is covered by plate-shaped spring 14. Top 10 of pole member 11 is pressed by pressing bolt 12 through plate-shaped spring 14 when pressing bolt 12 is screwed. Top 10 presses key member 5 against key member 6. Key members 5 and 6 are displaced outward as guided by their tapered surfaces, such that key members 5 and 6 are pressed against the inner surface of mounting hole 2 and the outer surface of rotary shaft 3.

Figure 7:
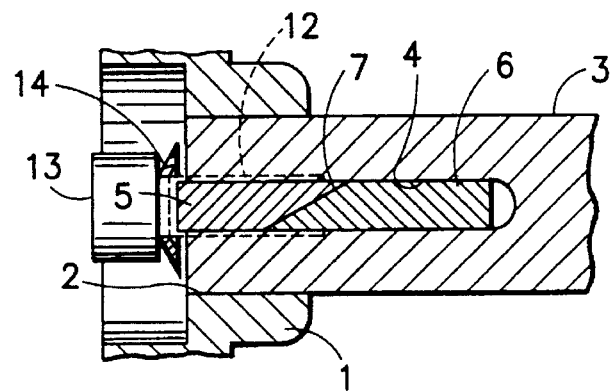
FIG. 7 is a cross section view of an alternative embodiment of a pressing bolt for fixing a rotary body along the line V—V of FIG. 6.

Top 13 of pressing bolt 12 can be enlarged such that top 13 can directly press top 10 of pole member 11 without plate-shaped spring 14. Referring to FIG. 7, without pole member 11, key member 5 extended to the side out of the end of rotary shaft 3 can be pressed directly by top 13 and plate-shaped spring 14.

Figure 8:
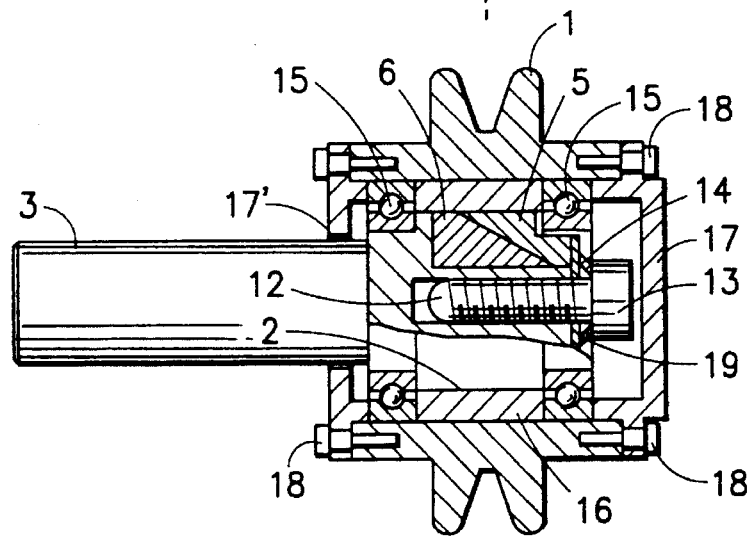
FIG. 8 is a cross section view of a device for fixing a rotary body along the line VIII—VIII of FIG. 9.
Figure 9:
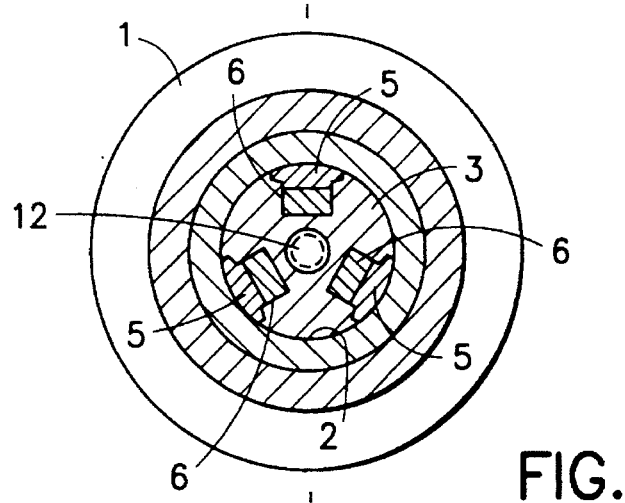
FIG. 9 is a cross section view of the device of FIG. 8 along the line IX—IX.

Referring to FIGS. 8 and 9, in another embodiment of the invention, a shaft support 15 such as a ball bearing is formed between rotary body 1 and rotary shaft 3. Key member 5 extended outward by tightening pressing bolt 12 is in contact with the inner surface of mounting hole 2, so that rotary body 1 and rotary shaft 3 are fixed. When pressing bolt 12 is relaxed, rotary body 1 is movably attached to rotary shaft 3 through shaft support 15.

A push member 16 attached in the center of rotary body 1 has an appropriate solidity. There are grease covers 17 and 17', a cover fixing screw 18, and a washer 19. In this case, the inner surface of push member 16 forms mounting hole 2.

Figure 10:
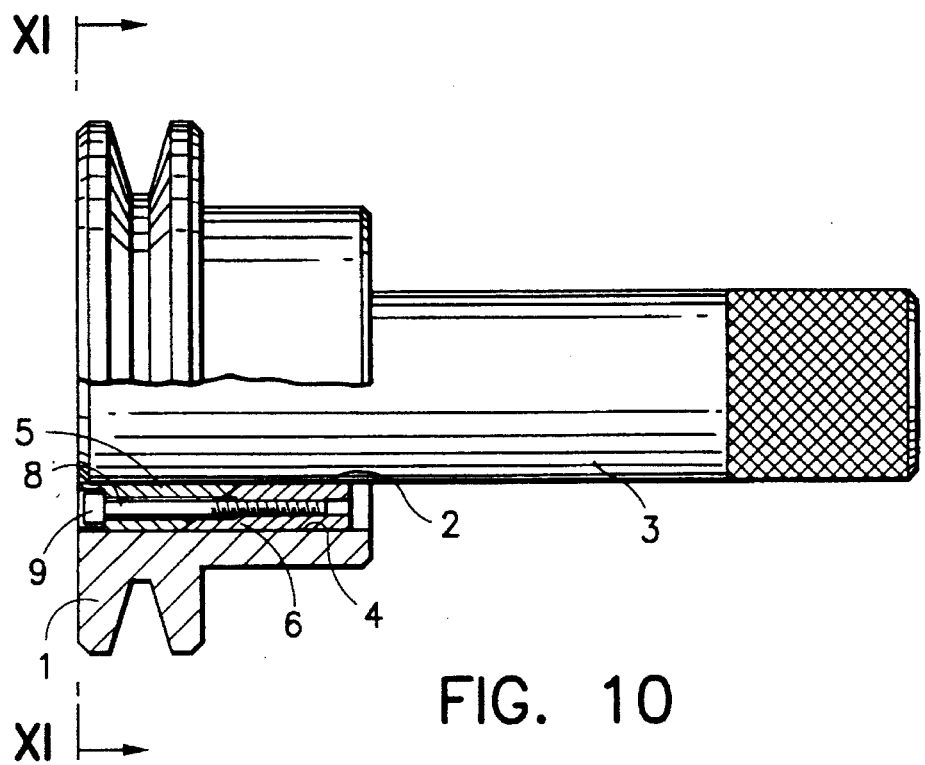
FIG. 10 is a partial cross section view of a device for fixing a rotary body along the line, X—X of FIG. 11.
Figure 11:
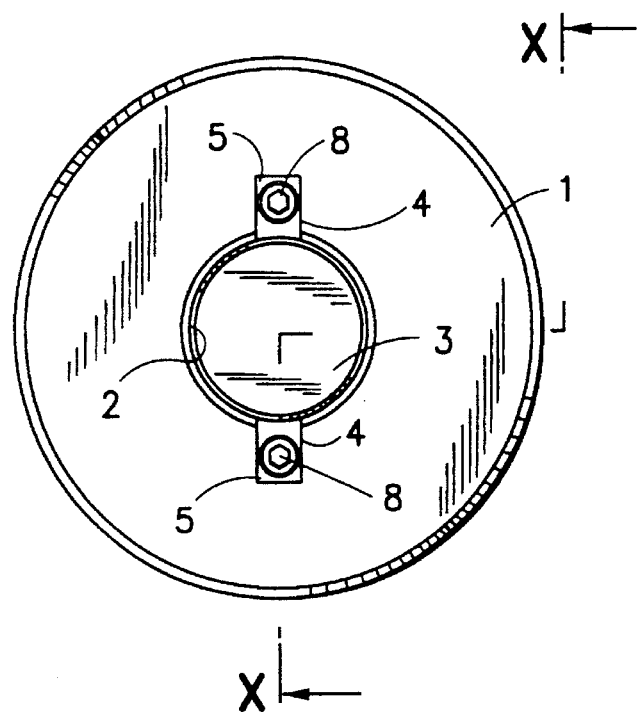
FIG. 11 is a plan view of the device of FIG. 10 along the line XI—XI.

In the above embodiment, groove portions are formed at the outer surface of rotary shaft 3. It is acceptable to form grooves at the inner surface of rotary body 1. Referring to FIG. 10 and 11, in an embodiment of the invention, one side surface of key members 5 and 6 is formed as a spherical shape as outer surface of rotary shaft 3. When clamping bolt 8 is screwed, key member 5 is pressed to the outer surface of rotary shaft 3. At the same time, key member 6 is pressingly fixed to rotary body 1. It is possible to utilize a combination of the above embodiments.

Figure 12:
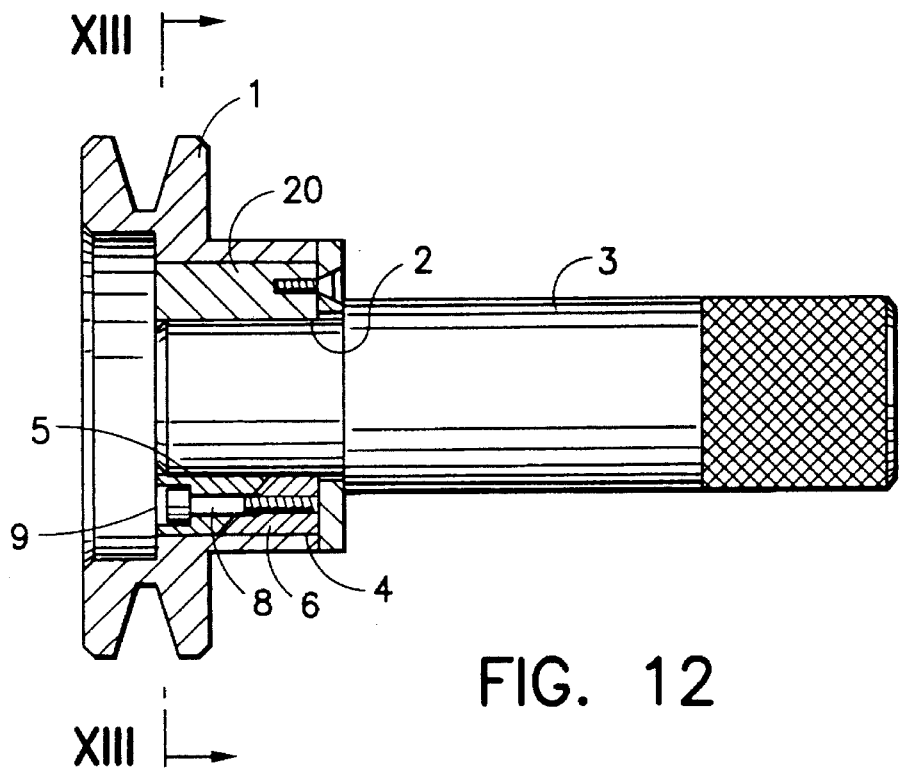
FIG. 12 is a cross section view of a device for fixing a rotary body along the line XII—XII of FIG. 13.
Figure 13:
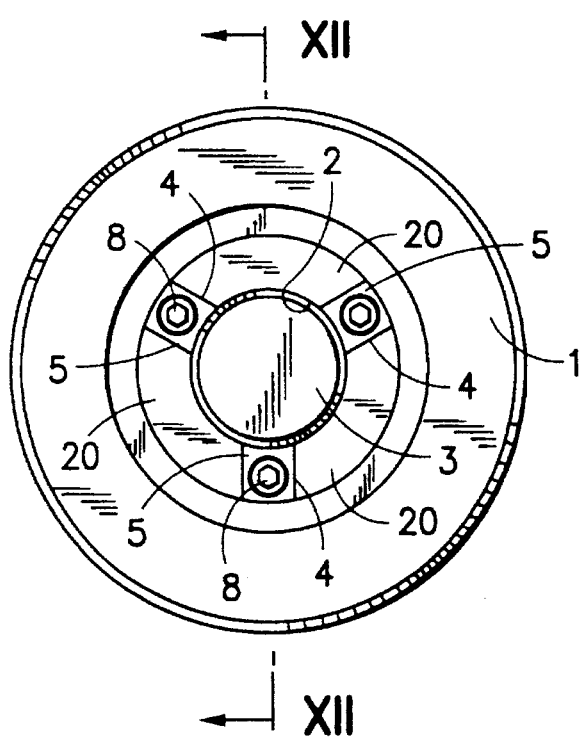
FIG. 13 is a plan cross section view of the device of FIG. 12 along the line XIII—XIII.

In the embodiment, groove portions are formed by a cutting process. However it is possible to produce the groove portions 4 by any appropriate process. Referring to FIG. 12 and 13, in another embodiment of the invention, a plurality of fan-shaped members 20 are arranged in the center of rotary body 1 to form a mounting hole. Spaces formed between fan-shaped members 20 are utilized as groove portions 4. It is possible to simply produce groove portions in the above way.

In the invention, key members 5 and 6 firmly fix a rotary shaft and a rotary body as by a wedge pressed in the longitudinal direction of the rotary shaft. On the other hand, since a groove portion having key members 5 and 6 is formed either at the inner surface of the rotary body or at the outer surface of the rotary shaft, the invention can create a slippage between the rotary body and the rotary shaft when an over-load force occurs to the rotary body. It is possible to apply the invention for the system containing a rotary body such as a gear, a pulley, and a drum attached to a rotary shaft such as a motor shaft, a driving shaft, and a power transmission shaft.

What is claimed is:

1. A device for fixing a rotary body, having a mounting hole, on a rotary shaft, comprising:

a groove portion formed in a longitudinal direction of said rotary shaft at one of an inner surface of said mounting hole of said rotary body and an outer surface of said rotary shaft;

first and second key members having tapered ends;

means for resiliently urging said key members against each other in said groove portion such that said tapered ends of said first and second key members make end to end contact;

said tapered ends being effective to cause a displacement of a center axis of each of said first and second key members, said displacement being responsive to said means for resiliently urging;

said displacement being effective to force said first key member against said inner surface of said mounting hole and being effective to force said second key member against said outer surface of said rotary shaft in order to fix said rotary body to said rotary shaft;

said mounting hole is formed by a plurality of inserted members located at the center of said rotary body; and said groove portion is formed between said plurality of inserted members.

2. A device for fixing a rotary body according to claim 1, wherein said means for resiliently urging includes:

a fixing bolt which penetrates into said first key member and is screwed into said second key member; and an elastic member placed between a head of said fixing bolt and said first key member, thereby urging said first key member against said second key member.

3. A device for fixing a rotary body according to claim 1, wherein said means for resiliently urging includes a pressing bolt which screws into an end of said rotary shaft.

4. A device for fixing a rotary body according to claim 3, wherein:

said first and second key members are at a plurality of locations at one of said inner surface of said mounting hole and said outer surface of said rotary shaft.

5. A device for fixing a rotary body according to claim 4, wherein:

said means for resiliently urging further includes a plate spring;

a top of said pressing bolt presses said first and second key members through said plate spring.

6. A device for fixing a rotary body according to claim 3, wherein:

said means for resiliently urging further includes a plate spring;

a top of said pressing bolt presses said first and second key members through said plate spring.

7. A device for fixing a rotary body according to claim 1 further comprising a shaft support formed at said inner surface of said mounting hole.

* * * * *